United States Patent
Arnold (10) Patent No.: US 11,822,566 B2
(45) Date of Patent: Nov. 21, 2023

(54) INTERACTIVE ANALYTICS WORKFLOW WITH INTEGRATED CACHING

(71) Applicant: Alteryx, Inc., Irvine, CA (US)

(72) Inventor: Jeff Arnold, Arvada, CO (US)

(73) Assignee: Alteryx, Inc., Irvine, CA (US)

( * ) Notice: Subject to any disclaimer, the term of this patent is extended or adjusted under 35 U.S.C. 154(b) by 134 days.

(21) Appl. No.: 17/396,559

(22) Filed: Aug. 6, 2021

(65) Prior Publication Data

US 2023/0039097 A1 Feb. 9, 2023

(51) Int. Cl.
*G06F 16/25* (2019.01)
*G06F 16/2455* (2019.01)
*G06F 3/0484* (2022.01)
*G06F 3/04817* (2022.01)

(52) U.S. Cl.
CPC .......... *G06F 16/252* (2019.01); *G06F 3/0484* (2013.01); *G06F 3/04817* (2013.01); *G06F 16/24552* (2019.01)

(58) Field of Classification Search
CPC ............. G06F 16/252; G06F 16/24552; G06F 3/04817; G06F 3/0484
See application file for complete search history.

(56) References Cited

U.S. PATENT DOCUMENTS

| 2012/0210427 A1* | 8/2012 | Bronner .................. H04L 63/30 726/23 |
| 2015/0178062 A1 | 6/2015 | Adderly et al. |
| 2017/0038919 A1* | 2/2017 | Moss .................... G06F 3/0482 |

OTHER PUBLICATIONS

PCT International Search Report and Written Opinion, PCT Application No. PCT/US22/73424, dated Sep. 29, 2022, 15 pages.

* cited by examiner

*Primary Examiner* — Irete F Ehichioya
*Assistant Examiner* — Xiaoqin Hu
(74) *Attorney, Agent, or Firm* — Fenwick & West LLP (57) ABSTRACT

A data analytics application receives a workflow that includes a sequence of tools. Each tool performs a data analytics function. The data analytics application processes a data file using the sequence of tools to generate a result item representing an outcome of the processing of the data file. The data analytics application stores one or more metadata files, each of which includes data generated by an interactive tool in the sequence during the processing of the data file. The data analytics application receives a user input through an interactive element associated with an interactive tool in the sequence. The interactive element can modify an operation of the interactive tool based on the user input. The data analytics application retrieves the metadata file for the interactive tool and processes the metadata file by using a subset of the sequence of tools and the user input to generate a different result item.

20 Claims, 9 Drawing Sheets

610 Receive an analytics workflow comprising a sequence of tools, each tool in the sequence adapted to perform a data analytics function, an interactive element associated with a particular tool in the sequence and adapted to receive user inputs to modify an operation of the particular tool

620 Process a data file by using the sequence of tools to generate a first result item that represents an outcome of the processing of the data file

630 Store a metadata file for the particular tool, the metadata file including data generated by the particular tool from performance of the data analytics function of the particular tool during the processing of the data file

640 Receive a user input through the interactive element associated with the particular tool

650 In response to receiving the user input, retrieve the metadata file for the particular tool

660 Process the metadata file for the particular tool by using a subset of the sequence of tools and the user input to generate a second result item that is different from the first result item, the subset of the sequence of tools starting with the particular tool

INTERACTIVE ANALYTICS WORKFLOW WITH INTEGRATED CACHING

BACKGROUND

Field of Art

The described embodiments pertain in general to data analytics, and in particular to an interactive analytics workflow with integrated caching.

Description of the Related Art

The growth of data analytic platforms, such as Big Data Analytics, has expanded data processing into a tool for processing large volumes of data to extract information having business value. For example, a small business may utilize a third-party data analytics environment employing dedicated computing and human resources to gather, process, and analyze vast amounts of data from various sources, such as external data providers, internal data sources (e.g., files on local computers), Big Data stores, and cloud-based data (e.g., social media information). Processing such large data sets, as used in data analytics, in a manner that extracts useful quantitative and qualitative information typically requires complex software tools implemented on powerful computer devices.

Currently, analytics workflows are widely used to perform data processing. However, the currently available workflow tools are limited due to their run-and-quit applications, meaning these tools run a workflow to perform a data processing task and quit once the task is finished. It is hard to perform another data processing task without creating and running a new workflow, which consumes computing power and time. Given the limitation of the current data analytics technology, improved analytics technologies are needed for more efficient processing of large data sets.

SUMMARY

The above and other issues are addressed by a computer-implemented method, computer system, and computer-readable storage medium. An embodiment of the computer-implemented method includes receiving an analytics workflow comprising a sequence of tools. Each tool in the sequence is adapted to perform a data analytics function. An interactive element is associated with a particular tool in the sequence and is adapted to receive user inputs to modify an operation of the particular tool. The method further includes processing a data file by using the sequence of tools to generate a first result item. The first result item represents an outcome of the processing of the data file. The method further includes storing a metadata file for the particular tool. The metadata file includes data generated by the particular tool from performance of the data analytics function of the particular tool during the processing of the data file. The method further includes receiving a user input through the interactive element associated with the particular tool. The method further includes in response to receiving the user input, retrieving the metadata file for the particular tool. The method also includes processing the metadata file for the particular tool by using a subset of the sequence of tools and the user input to generate a second result item. The second result item is different from the first result item. The subset of the sequence of tools starts with the particular tool.

An embodiment of the computer system includes a computer processor for executing computer program instructions. The system also includes a non-transitory computer-readable storage medium storing computer program instructions that when executed cause the computer processor to perform operations. The operations include receiving an analytics workflow comprising a sequence of tools. Each tool in the sequence is adapted to perform a data analytics function. An interactive element is associated with a particular tool in the sequence and is adapted to receive user inputs to modify an operation of the particular tool. The operations further include processing a data file by using the sequence of tools to generate a first result item. The first result item represents an outcome of the processing of the data file. The operations further include storing a metadata file for the particular tool. The metadata file includes data generated by the particular tool from performance of the data analytics function of the particular tool during the processing of the data file. The operations further include receiving a user input through the interactive element associated with the particular tool. The operations further include in response to receiving the user input, retrieving the metadata file for the particular tool. The operations also include processing the metadata file for the particular tool by using a subset of the sequence of tools and the user input to generate a second result item. The second result item is different from the first result item. The subset of the sequence of tools starts with the particular tool.

An embodiment of the non-transitory computer-readable memory stores executable computer program instructions. The instructions are executable to perform operations. The operations include receiving an analytics workflow comprising a sequence of tools. Each tool in the sequence is adapted to perform a data analytics function. An interactive element is associated with a particular tool in the sequence and is adapted to receive user inputs to modify an operation of the particular tool. The operations further include processing a data file by using the sequence of tools to generate a first result item. The first result item represents an outcome of the processing of the data file. The operations further include storing a metadata file for the particular tool. The metadata file includes data generated by the particular tool from performance of the data analytics function of the particular tool during the processing of the data file. The operations further include receiving a user input through the interactive element associated with the particular tool. The operations further include in response to receiving the user input, retrieving the metadata file for the particular tool. The operations also include processing the metadata file for the particular tool by using a subset of the sequence of tools and the user input to generate a second result item. The second result item is different from the first result item. The subset of the sequence of tools starts with the particular tool.

The figures depict various embodiments for purposes of illustration only. One skilled in the art will readily recognize from the following discussion that alternative embodiments of the structures and methods illustrated herein may be employed without departing from the principles of the embodiments described herein. Like reference numbers and designations in the various drawings indicate like elements.

DETAILED DESCRIPTION

Figure 1:
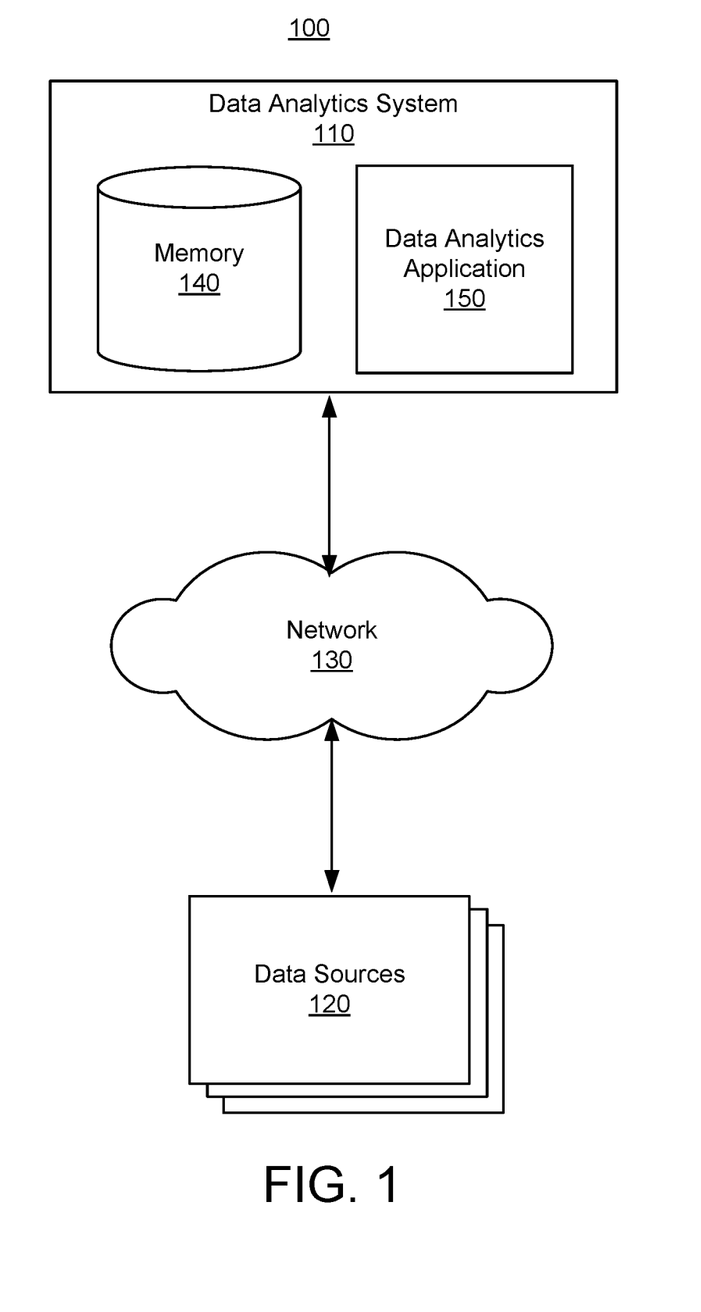
FIG. 1 is a block diagram illustrating a data analytics environment including a data analytics system according to one embodiment.

FIG. 1 is a block diagram illustrating a data analytics environment 100 including a data analytics system 110 according to one embodiment. The environment 100 further includes multiple data sources 120 connected to the data analytics system 110 via a network 130. Although the illustrated environment 100 contains only one data analytics system 110 coupled to multiple data sources 120, embodiments can have multiple data analytics systems and a singular data source.

The data analytics system 110 is a computer-based system utilized for processing large amounts of data. The data are collected, gathered, or otherwise accessed from the multiple data sources 120 via the network 130. The data analytics system 110 can implement scalable software tools and hardware resources employed in data processing tasks from a wide variety of data sources. A data processing task (also referred to as a task or data analytics task) is a computing operation for processing data. A data processing task includes, e.g., accessing data, preparing data, blending data, packaging data, analyzing data, other types of operations on data, or some combination thereof. The data analytics system 110 can perform multiple tasks in parallel. When it has computer resources (e.g., memory) available, the data analytics system 110 can pick a task to perform from a plurality of tasks that are ready to be performed.

In the embodiment of FIG. 1, the data analytics system 110 includes a memory 140 and a data analytics application 150. The memory 140 stores data used in data analytic operations and provides access to data storage area(s). In some embodiments, the memory 140 includes random access memory (RAM), hard disk drive (HDD), solid-state drive (SSD), other forms of computer memory, or some combination thereof. In some embodiments, the memory 140 includes a primary memory 140 providing relatively fast access to a relatively small data storage area and a secondary memory 150 providing relatively slow access to a relatively large data storage area.

Figure 2:
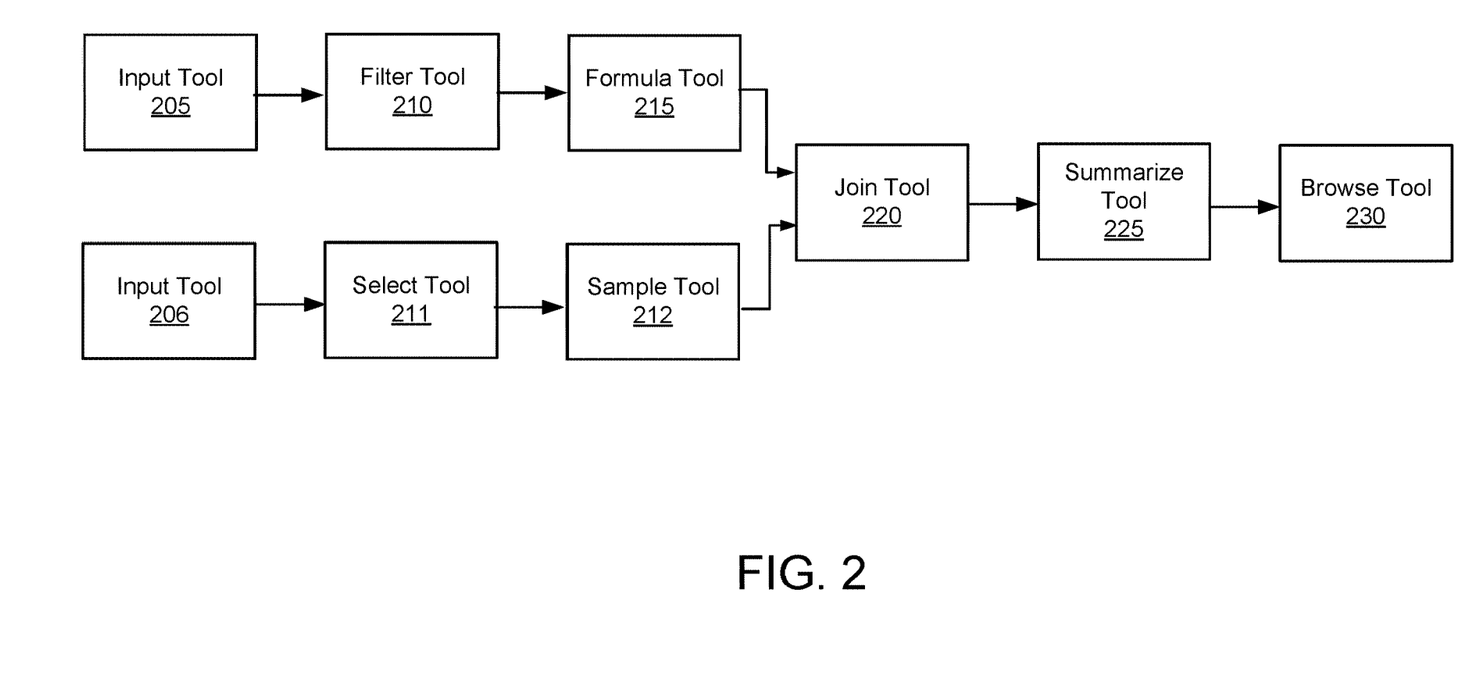
FIG. 2 is a block diagram illustrating a workflow created using the data analytics system to process data according to one embodiment.

The data analytics application 150 is a software application supporting execution of data analytics tasks by using workflows, such as the workflow illustrated in FIG. 2. A workflow (also referred to as "analytics workflow") is a sequence of data processing tools (also referred to as tools), through which a data analytics task passes from initiation (e.g., input of a data file) to completion (e.g., output of an outcome of the task). Each tool in the sequence performs a specific processing operation or data analytics function, such as input, output, preparation, join, predictive, spatial, investigation, parse, transform, and so on. Execution of the workflow includes operations of the tools in the workflow and generates a result item representing the outcome of the task. The result item, in one example, is a chart that provides a visual representation of the outcome of the task.

The data analytics application 150 provides an environment that facilitates creation of workflows. For instance, the data analytics application 150 provides a visual workflow environment supported by a GUI of the data analytics application 150. The visual workflow environment enables a set of drag and drop tools that eliminate the need for providing software code to design a workflow and eliminate the need to identify complex formulas to be implemented by a workflow. In another embodiment, the workflow 200 is created and described in a document, such as an extensible markup language (XML) document.

The environment also facilitates creation of interactive workflows. An interactive workflow is a workflow that includes an interactive element coupled with a particular tool in the workflow. The data analytics application 150 generates the interactive element based on the data analytics function of the particular tool. The data analytics application 150 applies the interactive element to the particular tool, by either affiliating the interactive element with the particular tool or adding the interactive element into the workflow as a new tool preceding the particular tool. An interactive workflow can execute without or without user inputs, or with different user inputs.

In some embodiments, execution of the interactive workflow generates an interface icon and a result item. The interface icon is defined by the interactive element and is in communication with the interactive element. The interface icon is adapted to receive user inputs and send the user inputs to the interactive element. For purpose of illustration, taking an interactive element coupled with a filter tool in a workflow for example, the interactive element defines its interface icon as clickable buttons that allow a user to click to select a date. The interactive element is adapted to manipulate an operation of the filter tool by using the date selected by the user as a filtering parameter. In this example, the result item of the workflow is a chart illustrate data for different dates. The chart includes clickable icons corresponding to the dates. The user, interested in data for a particular date, can click the corresponding clickable icon in the chart. The user's click is transmitted to the interactive element. The interactive element sends the particular date to the filter tool and modifies the operation of the filter tool so that the filter tool filters data based on the particular date selected by the user.

The interactive workflows generated by the data analytics application 150 are advantageous as they allow users to manipulate a data processing result by simply interacting with the interface icon without creating a new workflow or changing data input into the workflow. Such interactive workflows do not just run and quit. Instead, they can re-run as users interact with their interface icons and generate new results based on the user interaction. Thus, the data analytics application 150 provides a more convenient and efficient data analytics tool, compared with the conventional data analytics technologies.

Furthermore, the data analytics application 150 can re-use data generated during an execution of the interactive workflow for another execution of the interactive workflow to optimize efficiency of the interactive workflow in data processing tasks. An interactive workflow includes one or more interactive tools. An interactive tool is a tool associated with an interactive element that is adapted to receive user inputs and modifies operation of the tool based on the tool. For instance, the interactive element, in response to receiving a user input, can transmit the user input into the tool as a parameter for the tool to process data. The data analytics application 150 caches metadata files generated during an execution of an interactive workflow. The execution of an interactive workflow includes processing of a data file by using a sequence of tools in the interactive workflow and generates a result item representing an outcome of the data processing. Each metadata file includes data generated by an interactive tool from performance of the data analytics function of the interactive tool during the processing of the data file. In response to receiving a user input through the corresponding interactive element associated with an interactive tool in the interactive workflow, the data analytics application 150 retrieves the metadata file for the interactive tool and uses the metadata file for a re-execution of a part of the workflow based on the user input. For instance, the data analytics application 150 identifies a subset of the sequence of tools, which, e.g., starts with the interactive tool and includes tools subsequent to the interactive tool in the sequence. The data analytics application 150 uses the tools in the subset and the metadata file to generate a new result item. The new result item is different from the previous result item and represents an outcome of the processing of the data file based on the user input.

With such a technique, the data analytics application 150 can re-use data (i.e., metadata files) from previous data processing tasks and run a subset of the tools (as opposed to all the tools in the workflow) for subsequent data processing tasks triggered by user inputs. Thus, the data analytics application 150 provide a technical advantage of saving computing power and time needed for processing of data files based on user inputs.

Moreover, the data analytics application 150 may associate integrated caching with the interactive workflow. Each interactive tool in the interactive workflow is associated with a separate cache that stores the metadata file of the tool. To access a metadata file of an interactive tool, the data analytics application 150 can identify the corresponding cache based on the interactive tool and retrieve the metadata file from the identified cache. Compared with conventional techniques that typically retrieves data files from external data sources or solid-state drive (SSD) storage, the data analytics application 150 reduces latency for querying and receiving data. Also, the data analytics application 150 saves computing resources by not caching metadata generated by non-interactive tools, i.e., tools not associated with any interactive element Furthermore, in some embodiments, the data analytics application 150 facilitates creation of an interactive workflow including multiple branch sequences of tools. An interactive element can be put into one of the branch sequences of tools. For a user input received by the interactive element, a subset of the tools in the branch sequence including the interactive element re-runs to generate result items incorporating the user input, but re-running of the tools in the other branch sequences can be avoided to further reduce consumption of computing power and time.

In some cases, the data analytics application 150 provides software that supports networked, or cloud-based, access to data analytic tools and macros to multiple end users. As an example, the data analytics application 150 supports creation of workflows in a manner of dashboard, web application, mobile application, etc. As another example, the data analytics application 150 allows users to share, browse and consume analytics in a manner similar to a mobile application store or other cloud-based service. Analytic data, macros and workflows can be packaged and executed as a smaller scale and customizable analytic application (i.e., an app), for example, that can be accessed by other users of the data analytics system 110. In some cases, access to published analytic apps can be managed by the data analytics system 110, namely granting or revoking access, and thereby providing access control and security capabilities. The data analytics application 150 can perform functions associated with analytic apps such as creating, deploying, publishing, iterating, updating and the like.

Additionally, the data analytics application 150 can support functions performed at various stages involved in data analytics, such as the ability to access, prepare, blend, analyze, and output analytic results. In some cases, the data analytics application 150 can access the various data sources, retrieving raw data, for example, in a stream of data. Data streams collected by the data analytics application 150 can include multiple records of raw data, where the raw data is in differing formats and structures. After receiving at least one data stream, the data analytics application 150 can perform operations to allow records of the data stream to be used as an input into data analytic operations. Moreover, analytic functions involved in statistical, qualitative, or quantitative processing of records, such as predictive analytics (e.g., predictive modelling, clustering, data investigation) can be implemented by data analytics application 150.

As mentioned above, the data sources 120 provide electronic data to the data analytics system 110. A data source 120 may be a computer, a database, or a cloud storage system. A data source 120 may also be a computer system that can retrieve data from another source. The data sources 120 may be remote from the data analytics system 110 and provide the data via the network 130. In addition, some or all data sources 120 may be directly coupled to the data analytics system and provide the data without passing the data through the network 130. The data provided the data sources 120 is typically organized into data records, which each data record including one or more values. For example, a data record provided by a data source may include a series of comma-separated values. The data describes information of relevance to an enterprise using the data analytics system. For example, data from a data source 120 can describe computer-based interactions (e.g., click tracking data) with content accessible on websites and/or with social media applications.

The network 130 represents the communication pathways between the data analytics system 110 and the data sources 120. In one embodiment, the network 130 is the Internet and uses standard communications technologies and/or protocols. The data exchanged over the network 130 can be represented using technologies and/or formats including the hypertext markup language (HTML), the extensible markup language (XML), etc. In another embodiment, the entities can use custom and/or dedicated data communications technologies instead of, or in addition to, the ones described above.

FIG. 2 is a block diagram illustrating a workflow 200 created using the data analytics system 110 to process data according to one embodiment. The workflow 200 is executed by a computer device of the data analytics system 110. However, in other embodiments, the workflow 200 is deployed to another computer device that may be communicatively connected, via a network (e.g., the network 130), to the data analytics system 110.

A workflow can include a series of tools that perform specific processing operations or data analytics functions. The tools are arranged in an order. As a general example, tools of a workflow can perform one or more of the following data analytics functions: input/output; preparation; join; predictive; spatial; investigation; and parse and transform operations. Implementing a workflow can involve defining, executing, and automating a data analytics process, where data is passed to each tool in the workflow, and each tool performs its respective processing operation on the received data. A record, including an aggregated group of individual records, can be passed through the tools of a workflow, which allows for the individual processing operations to operate more efficiently on the data. Such data aggregation techniques can increase the speed of developing and running workflows, even with processing large amounts of data. A workflow can define, or otherwise structure, a repeatable series of operations, specifying an operational sequence of the specified tools. In some cases, the tools included in a workflow are performed in a linear order. In other cases, multiple tools can execute in parallel.

As illustrated, the workflow 200 of FIG. 2 includes input/output tools, illustrated as input tools 205 and 206, and browse tool 230. The input tools 205 and 206 function to access records from particular data sources 120. The inputs tools 205 and 206 bring into the workflow the accessed records and provide the records to the subsequent tools of the workflow 200. In this example, the input tool 205 provides accessed records to a filter tool 210 and the input tool 206 provides accessed records to a select tool 211. The browse tool 230 is located at the end of the workflow 200 and receives the output resulting from the execution of each of the upstream tools of the workflow 200. Although the browse tool 230 is located at the end of the workflow 200 in this example, the browse tool 230 can be added at any point in a workflow to review and verify results from execution of upstream tools of the workflow.

In continuing with the example of FIG. 2, the workflow 200 includes preparations tools, shown as the filter tool 210, the select tool 211, a formula tool 215, and a sample tool 212. The filter tool 210 queries records based on an expression and splits the data into two streams, a true stream that includes records that satisfy the expression and a false stream that includes records that do not satisfy the expression. The select tool 211 can be used to select, deselect, re-order and rename fields, change field type or size, and assign a description. The formula tool 215 creates or updates fields using one or more expressions to perform a broad variety of calculations and/or operations. The sample tool 212 limits a received stream of records to a number, percentage, or random set of records.

The workflow 200 also includes a join tool 220 that blends multiple data sources. Specifically, the join tool 220 combines two input data streams based on common fields (or record position). The workflow 200 of FIG. 2 is also shown to include a summarize tool 225 which is a parse and transform tool that can restructure and re-shape data to a format used in further analysis. The summarize tool 225 can also perform summarization of data by grouping, summing, counting, spatial processing, and string concatenation. In one embodiment, the output generated by the summarize tool 225 contains the results of the calculation(s).

In some embodiments, execution of the workflow 200 will cause the input tool 205 to pass records one at a time through the filter tool 210 and the formula tool 215, until all records are processed and have reached the join tool 220. Thereafter, the input tool 206 will begin passing records one at a time through the select tool 211 and sample tool 212, until the records are passed to the same join tool 220. Some individual tools of the workflow 200 may implement their own parallel operations, such as initiating a read of a block of data while processing the last block of data or breaking computer-intensive operations, such as a sort tool, into multiple parts.

Figure 3:
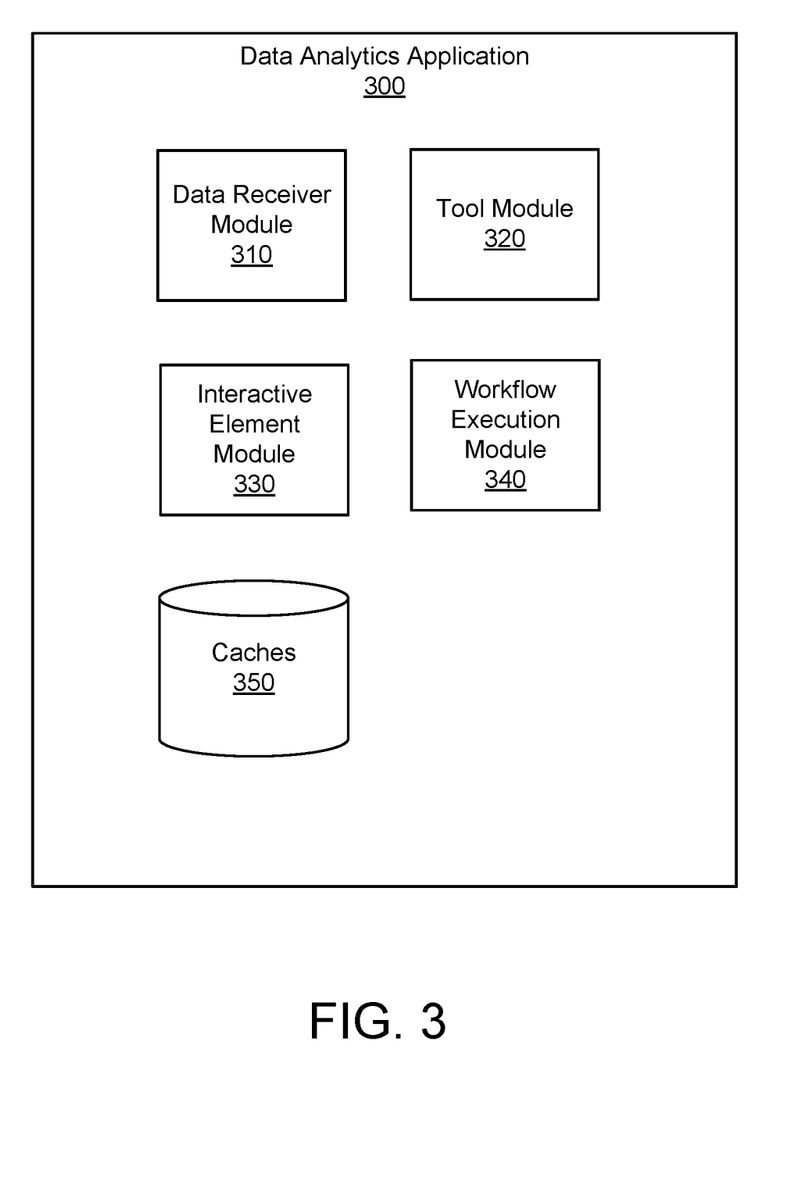
FIG. 3 is a block diagram illustrating a data analytics application according to one embodiment.

FIG. 3 is a block diagram illustrating a data analytics application 300 according to one embodiment. The data analytics application 300 facilitates creation and execution of interactive workflows. The data analytics application 300 is an embodiment of the data analytics application 150 in FIG. 1. In the embodiment of FIG. 3, the data analytics application 300 includes a data receiver module 310, a tool module 320, an interactive element module 330, and a workflow execution module 340, and a plurality of caches 360. Those of skill in the art will recognize that other embodiments can have different and/or other components than the ones described here, and that the functionalities can be distributed among the components in a different manner. For instance, the caches 360 may be not a part of the data analytics application 300, but included in a memory associated with the data analytics application 300, such as the memory 140.

The data receiver module 310 receives data files from data sources, e.g., the data sources 120, and provides the data files to other modules in the data analytics application 300. In one embodiment, the data receiver module 310 serves as the interface between the tools in the data analytics application, such as the input tools 206 illustrated in FIG. 2. In another embodiment, the data receiver module 310 is absent and the function of the data receiver module 310 is performed by the tools.

The tool module 320 provides a set of tools for creating workflows. Each tool performs a specific data analytics function. In some embodiments, the tool module 320 provide the tools included in the workflow 200 described in conjunction with FIG. 2. One or more tools of the tool module 320 may execute in parallel while processing data records for a workflow. A tool may run as multiple separate threads, with each thread operating on a separate core of the processor of the data analytics system 110. For example, an embodiment of the join tool distributes tasks associated with the join operation to multiple threads to leverage the parallel processing capabilities of the processor. A tool creates tasks to execute its operations. An operation of a tool includes one or more tasks. Each task is assigned to a thread of the tool for being performed by the thread.

In some embodiments, the set of tools are provided in a user interface (e.g., a GUI). Each tool has an icon indicating the data analytics function of the tool. The user interface allows a user, e.g., a workflow designer, to select tools and define relationships (e.g., logical relationship or sequential relationship) between the selected tools to create a workflow. The user interface may provide a description of each tool, e.g., including information describing the data analytics function of the tool, that helps the designer to understand the functions of the tools.

The interactive element module 330 provides interactive elements for creating interactive workflows. An interactive element is applicable to one or more tools and when applied to a tool, the interactive element is adapted to receive a user input and to use the user input to modify the operation of the tool. The interactive element defines an interface icon that is generated through execution of the interactive workflow and receives user inputs through the interface icon. The interactive element manipulates operation of the tool and/or other tools in the workflow. The interactive element supports various types of interface icons for receiving user inputs. Example interface icons include checkboxes, clickable buttons, text fields, list boxes, drop lists, date fields, and so on. In some embodiments, one interactive element corresponds to more than one interface icons.

In some embodiments, the interactive element module 330 generates an interactive element for a particular tool in a workflow based on the data analytics function of the particular tool in the workflow. The interactive element module 330 analyzes the data analytics function of the particular tool in the workflow and selects the interactive element from a plurality of candidate interactive elements based on the analysis. For instance, the interactive element module 330 determines parameters to be used in the operation of the particular tool for performing its data analytics function and selects the interactive element based on the parameters. Taking a filter tool for example, the interactive element module 330 determines that the data analytics function of the tool is filtering data and that the tool will need filtering parameters to perform its function. Based on the determination, the interactive element module 330 generates for the tool an interactive element that defines an input box allowing a user to input a filtering parameter. In some embodiments, the interactive element module 330 generates the interactive element further based on the data file to be processed by the tool. In the example of the filter tool, the interactive element module 330 determines that the data file includes a plurality of variables. The interactive element module 330 identifies the variables in the data file and generates an interactive element that defines a dropdown list including the variables. A user can select a variable from the dropdown list, which is to be used by the filter tool as a filtering parameter.

In some other embodiments, the interactive element module 330 provides a plurality of candidate interactive elements to a workflow designer, e.g., in the GUI, and receives from the workflow designer a selection of the interactive element from the candidate interactive elements. Each candidate interactive element may have a symbol or a description indicating the type of interaction supported by the interactive element. The workflow designer can drag an interactive element from the candidate interactive elements based on the symbol or description of the interactive element. The user interface also allows the workflow designer to define a relationship between the interactive element with a tool, e.g., by connecting the interactive element to a tool to affiliate the interactive element with the tool or by inserting the interactive element into the workflow as a new tool preceding the tool in the workflow.

In some embodiments, the user interface supported by the interactive element module 330 and the user interface supported by the tool module 320 are integrated. For instance, the tools and the interactive elements are provided in the same user interface. Workflow designers may select any of the tools and the interactive elements and define relationships among them. With such a user interface, workflow designers can create new interactive workflows (e.g., adding a tool to the workflow and affiliating an interactive element with the tool before adding another tool to the workflow) or apply interactive elements to existing workflows to make the existing workflows interactive (e.g., creating/retrieving a workflow before affiliating an interactive element to one of the tools in the workflow).

The workflow execution module 340 facilitates execution and re-execution of workflows (including interactive workflows). The workflow execution module 340 receives data files from the data receiver module 310 and sends the data files to workflows. An execution of a workflow processes a data file and generates result items. The workflow execution module 340 stores metadata files generated during the execution of the workflow for subsequent data processing by the workflow. For an interactive workflow, the execution also generates an interface icon corresponding to an interactive element, through which a user input can be received. The interface icon is adapted to receive user inputs. The interface icon can be a checkbox, clickable button, text field, list box, dropdown list, date field, and so on.

In one example, the workflow execution module 340 first executes an interactive workflow to process a data file without any user input. The first execution of the interactive workflow generates a first result item the represents the outcome of the processing of the data file by the sequence of tools in the interactive workflow. The workflow execution module 340 provides the first result item for display to the user. During the processing of the data file, each tool in the sequence may generate a metadata file, which includes data generated by the tool from performing its data analytics function. The workflow execution module 340 identifies interactive tool(s) in the interactive workflow and stores the metadata file for each interactive tool. Taking a filter tool adapted to select data based on a filtering parameter for example, the metadata file for the filter tool includes the data selected by the filter tool after the filter tool applies the filtering parameter on data received by the filter tool, e.g., from another tool in the workflow. The workflow execution module 340 saves the metadata files for the interactive tools in caches 350 (individually referred to as cache 350). Each cache 350 corresponds to a respective interactive tool in the interactive workflow and stores the metadata file for the respective interactive tool. In some embodiments, the metadata files for non-interactive tools are not cached, even if they are generated by such tools.

The first execution of the interactive workflow also generates an interface icon. The interface icon receives a user input and sends the user input to the interactive element, which triggers re-execution of the workflow to re-process the datafile based on the user input. In response to receiving the user input, the workflow execution module 340 retrieves the metadata file for the interactive tool. For instance, the workflow execution module 340 identifies the interactive tool from the interactive workflow based on the interactive element. Then the workflow execution module 340 identifies the metadata file based on the identification of the interactive tool. In some embodiments, the workflow execution module 340 stores metadata files for different tools in separate caches, each cache corresponding to a respective tool. The workflow execution module 340 can identify the cache corresponding to the interactive tool and retrieves the metadata file for the interactive tool from the identified cache.

The workflow execution module 340 also identifies a subset of the sequence of tools to be re-run for re-processing the data file based on the user input. The subset of the sequence starts with the interactive tool and may include one or more other tools in the interactive workflow. In some embodiments, the sequence of tools includes multiple branch sequences. Each branch sequence has a different collection of tools and therefore, performs a different processing and generates different result items. Different branch sequences may include one or more same tools. The workflow execution module 340 determines which branch sequence of tools includes the interactive tool and identifies the other tools in the subset based on the determination. For instance, in response to determining that a first branch sequence includes the interactive tool, the workflow execution module 340 adds the interactive tool itself and tools subsequent to the interactive tool in the first branch sequence to the subset. In embodiments where the workflow execution module 340 identifies multiple branch sequences including the tool associated with the interactive element, the workflow execution module 340 adds tools subsequent to the interactive tool in each of the identified branch sequences to the subset.

The workflow execution module 340 processes the metadata file by using the subset of the sequence of tools and the user input to generate a second result item. The second result item represents the outcome of processing the data file based on the user input and is different from the first item. In some embodiments, the workflow execution module 340 provides the second result item for display to the user either as a replacement of the first result item or separately from the first result item.

In some embodiments, the workflow execution module 340 also logs other information generated during execution of workflows, such as error messages, status of data processing, and so on. In some embodiments, the workflow execution module 340 facilitates a preview mode, through which workflow designers can test out workflows. The preview mode describes how workflows might function during actual execution.

Figure 4:
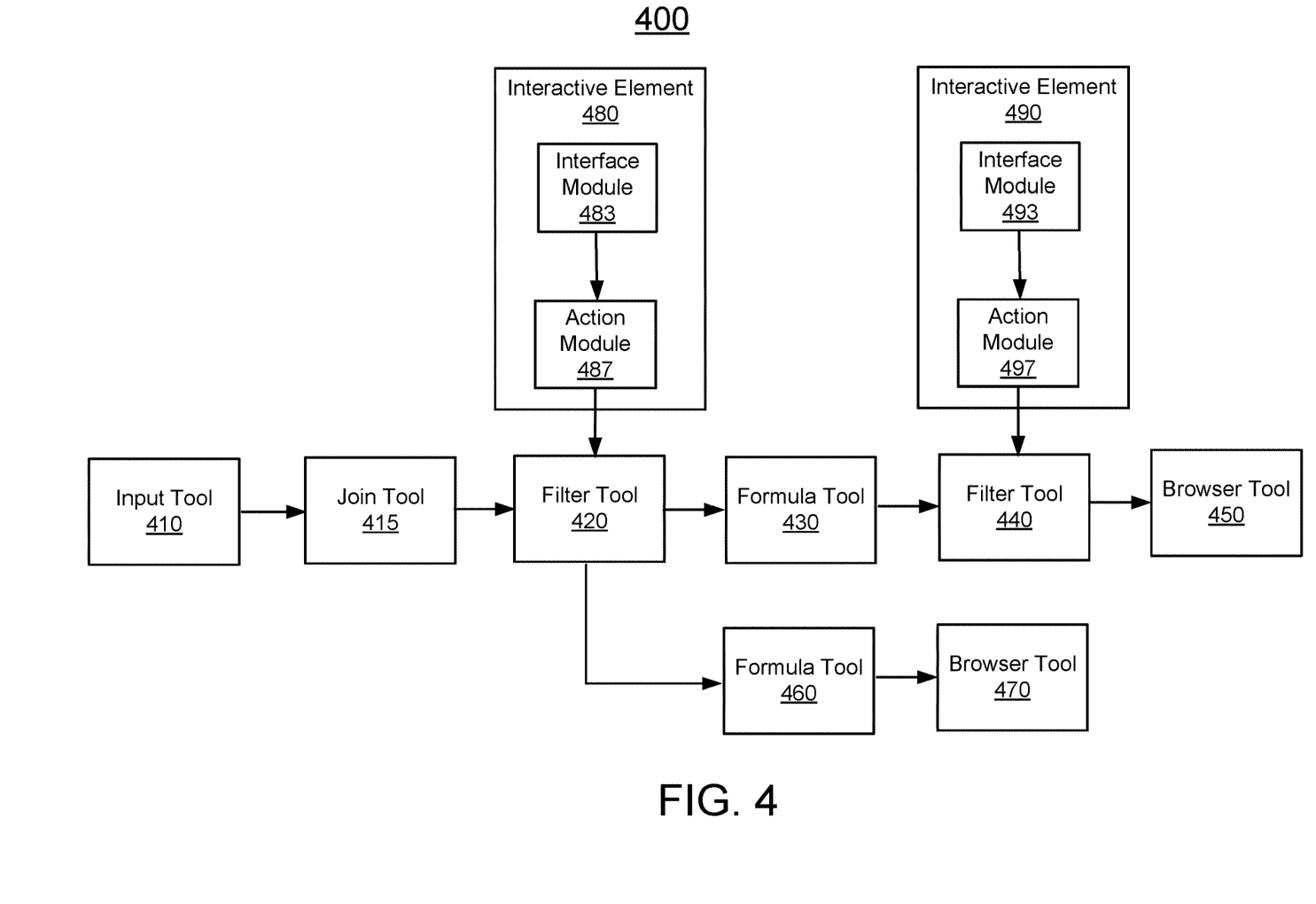
FIG. 4 is a schematic diagram illustrating an interactive workflow created using the data analytics application according to one embodiment.

FIG. 4 is a schematic diagram illustrating an interactive workflow 400 created using the data analytics application 150 according to one embodiment. The interactive workflow 400 processes data files and generates result items that represents an outcome of the processing. FIGS. 5A-F illustrate result items 510, 520, 530, 540, 550, and 560 generated by the interactive workflow 400 according to one embodiment.

The interactive workflow 400 may receive user inputs and updates results items based on the user inputs. The interactive workflow 400 has a sequence of tools, which form two branch sequences. The first branch sequence includes the input tool 410, the join tool 415, the filter tool 420, a formula tool 460 and a browse tool 470. The second branch sequence includes the input tool 410, the join tool 415, the filter tool 420, a formula tool 430, another filter tool 440, and a browse tool 450. In other embodiments, the interactive workflow 400 may include different tools and/or more interactive elements.

The input tool 410, join tool 415, and filter tool 420 are in both the first and second branch sequences. The input tool 410 receives data files, e.g., from a data source 120 illustrated in FIG. 1. The input tool 410 sends the data file to the join tool 430 that combines the data files into a new data file. The filter tool 420 filters data in the new data file based on one or more filtering parameters and generates filtered data. In some embodiments, the filter tool 420 receives a filtering parameter through the interactive element 480. The filter tool 420 is coupled with an interactive element 480 that includes an interface module 483 and an action module 487. The interface module 483 defines an interface icon, with which the user can interact to provide the filtering parameter. For instance, the interface module 483 specifies that the interface icon is an input box, clickable button, dropdown list, or other types of icons that users can interact with to provide filtering parameters. The interface module 483 is in communication with the interface icon and receives the filtering parameter provided by the user from the interface icon. In response to the interface module 483 receiving the filtering parameter, the action module 487 feeds the filtering parameter into the filter tool 420 and triggers an operation of the filter tool 420 based on the filtering parameter.

Figure 5A:
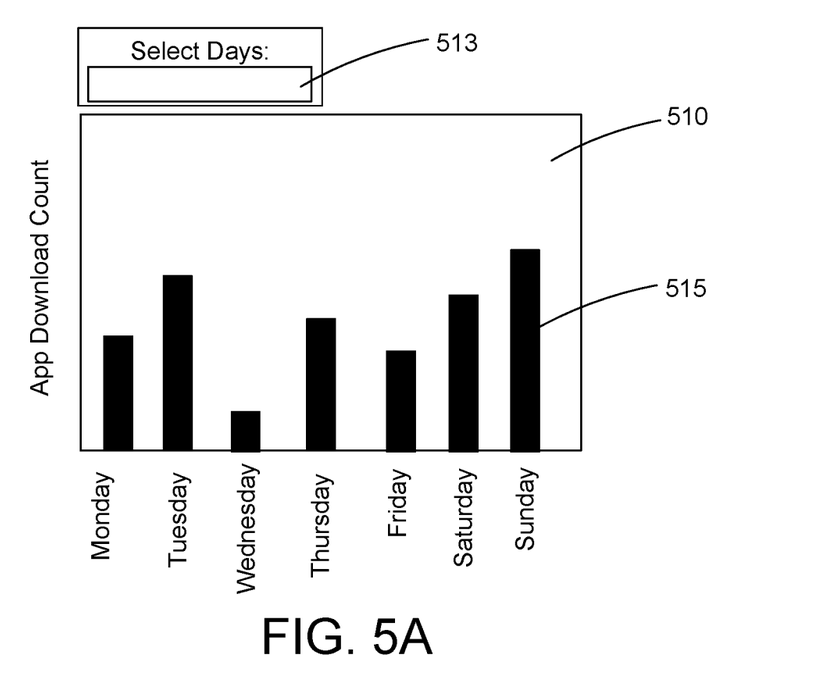
FIGS. 5A-F illustrate result items generated by the interactive workflow according to one embodiment.

The filter tool 420 sends the filtered data to the formula tool 460 in the first branch sequence. The formula tool 460 generates first new data based on a formula and sends the first new data to the browser tool 470. The browser tool 470 generates the result item 510 shown in FIG. 5A. The result item 510 represents at least some of the first new data. The result item 510 is a chart that includes a plurality of bars. Each bar indicates how many times an application was downloaded on the corresponding day. The result item 510 is associated with an interface icon 513 corresponding to the interface module 483. In the embodiment of FIG. 5A, the interface icon 513 is an input box, through which user can input text strings. The text string is an input to the interactive element 480. In FIG. 5A, the interface icon 513 is separate from the result item 510. However, in other embodiments, the interface icon 513 can be integrated with the result item. Also, each bar in the result item 510 is an interface icon 515 corresponding to the interface module 493. Each interface icon 515 is clickable for the user to select the corresponding day. The user's selection of a day is an input to the interactive element 490.

Figure 5B:
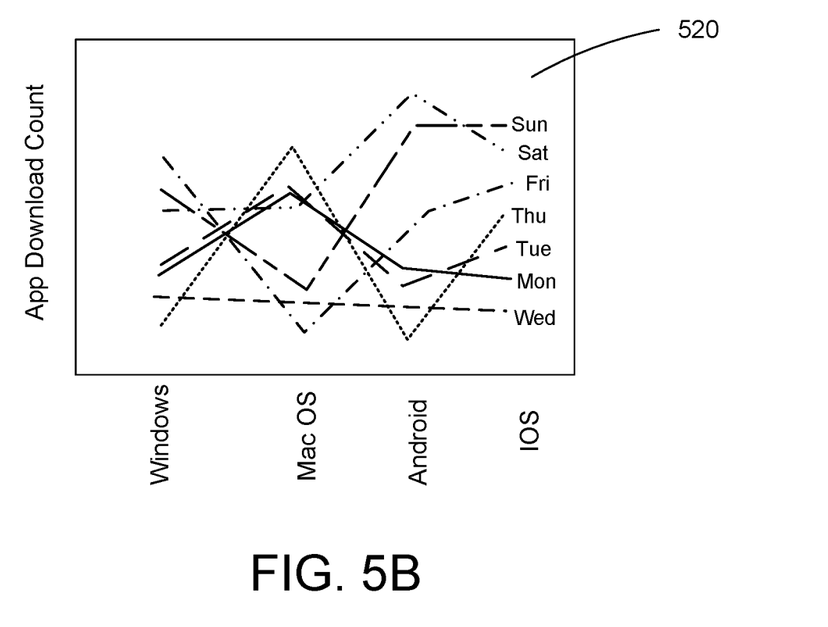

The filter tool 420 also sends the filtered data to the formula tool 430 in the second branch sequence. The formula tool 430 converts the filtered data to second new data by using a formula. The new data is then sent to the filter tool 440 that generates filtered second new data based on a filtering parameter. The filter tool 440, similar to the filter tool 420, is associated with an interactive element 490 that includes an interface module 493 and an action module 497. The interactive element 490 is adapted to receive user inputs to change the operation of the filter tool 440. The browse tool 450 receives the filtered second new data from the formula tool 430 and generates the result item 520 shown in FIG. 5B, which represents the filtered second new data. The result item 520 includes a plurality of curves. Each curve corresponds to a day shown in the result item 510 and shows how many times the application was downloaded to each of four types of client devices on the corresponding day. In the embodiment of FIG. 5B, the result item 520 is not associated with any interface icons. In other embodiments, the result item 520 may be associated with an interface icon corresponding to the interface module 493 of the interactive element 490.

The filtered data generated by the filter tool 420, first new data generated by the formula tool 460, second new data generated by the formula tool 430, and filtered second new data generated by the filter tool 440 are cached as metadata files for the tools. The metadata files can be re-used to re-process the data file based on user inputs to the interactive elements 480 and 490.

Figure 5C:
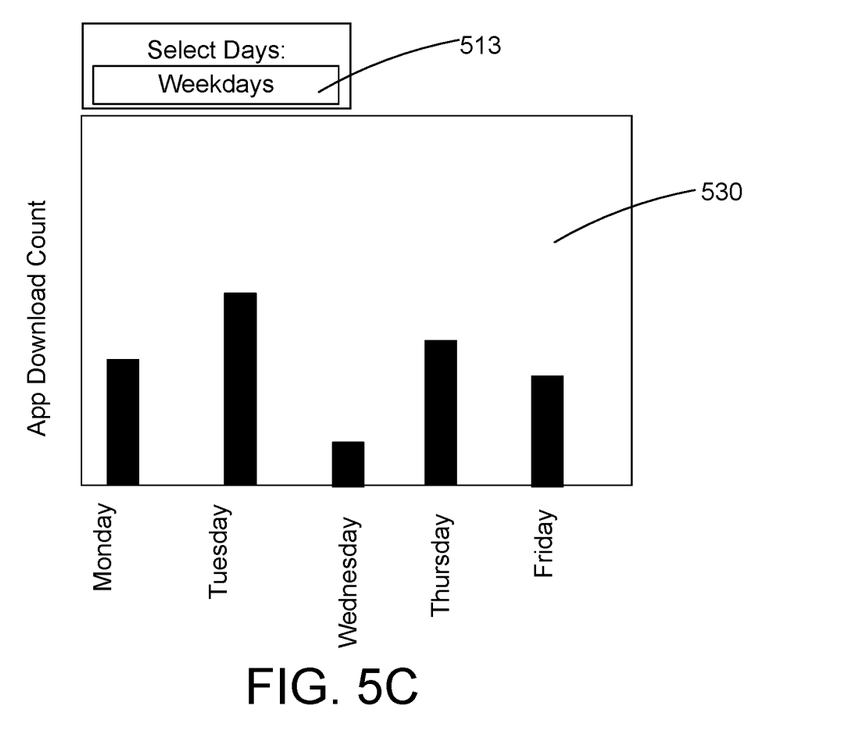
Figure 5D:
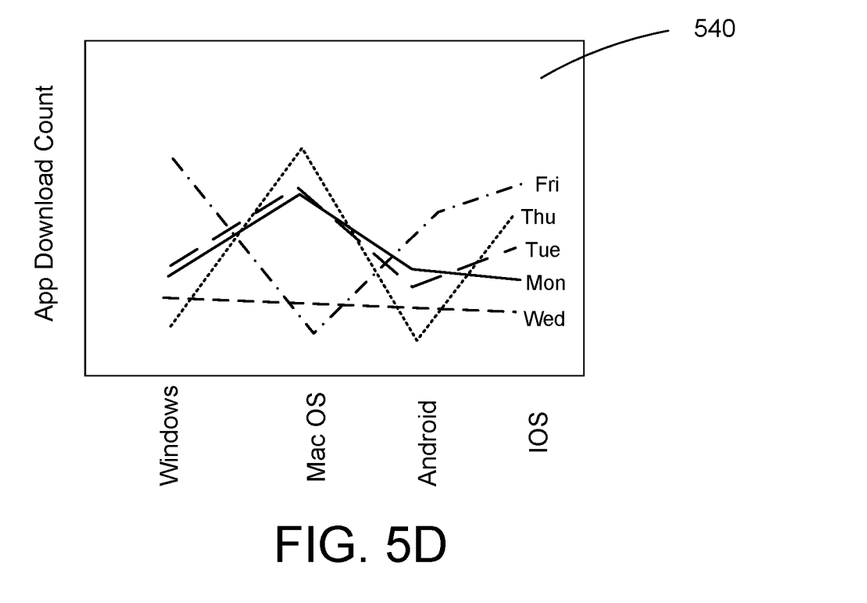

In FIG. 5C, a user selects weekdays through the interface icon 513. The interactive element 480 receives the user's selection through the interface icon 513. Since the interactive element 480 is associated with the filter tool 420, which is included in both the first and second branch sequences, a part of each of the two branch sequences are re-run to generate new result items representing results of processing the data files based on the user input. For the first branch sequence, the metadata file for the filter tool 420 is retrieved and input to the filter tool 420 for the filter tool to process the metadata file based on the user's selection, e.g., by using the user's selection as a filtering parameter to filter the metadata file. Then the formula tool 460 and browse tool 470 are re-run and generate the result item 530, which shows how many times the application was downloaded on the weekdays selected by the user. For the second branch sequence, the metadata file for the filter tool 420 is retrieved and input to the filter tool 420 for the filter tool to process the metadata file based on the user's selection. Then the formula tool 430, filter tool 440, and browse tool 450 are re-run based on the user input and generate the result item 540 in FIG. 5D, which shows the curves corresponding to the weekdays selected by the user. The curves for the weekend days, which are not selected by the user, are not shown in FIG. 5D. By using the metadata file for the filter tool 420 that was generated in the previous processing of the data files, the operation of the input tool 410 and the join tool 415 is avoided, which saves computing power and time. Also, as the metadata file is cached, it is faster to retrieve the metafile than to re-input the data files from the data sources, which further saves computing power and time.

Figure 5E:
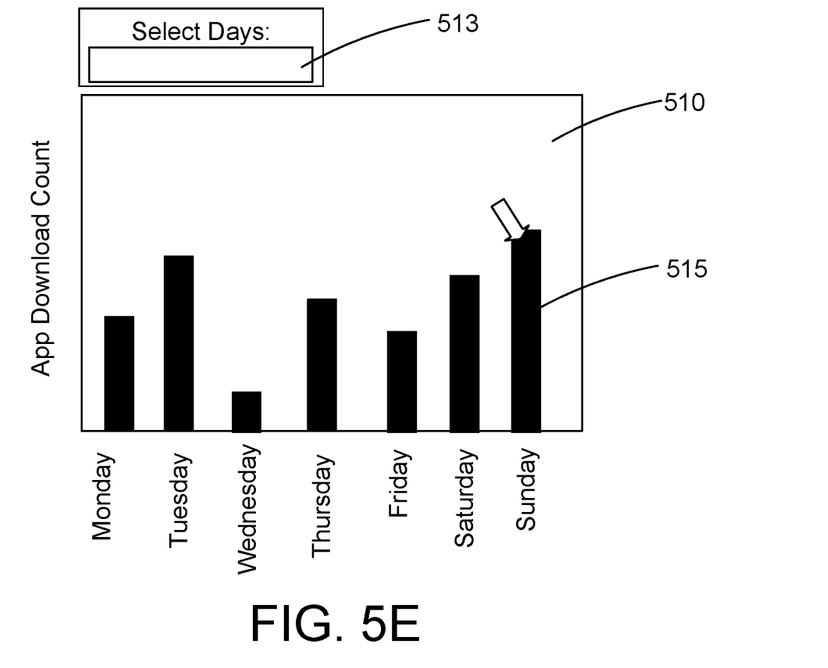
Figure 5F:
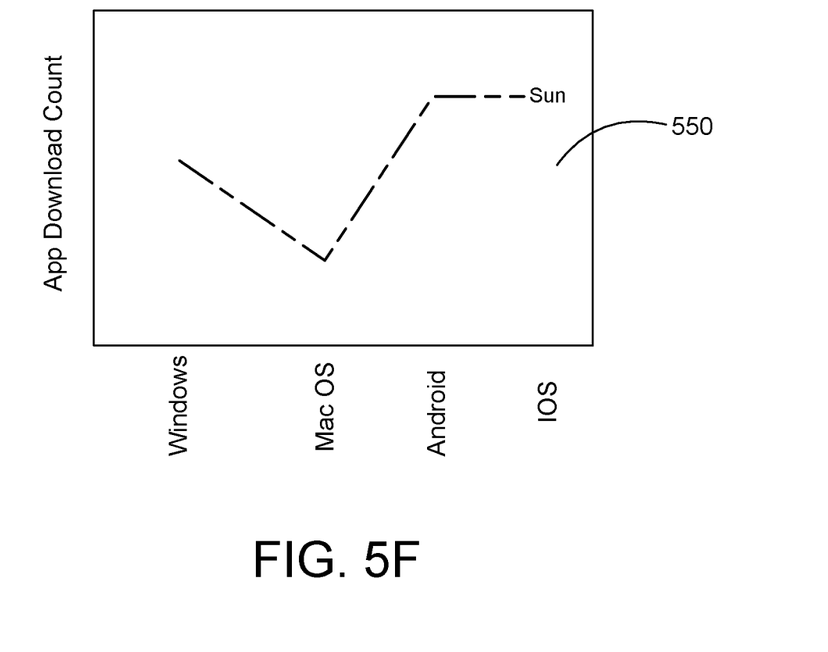

In FIG. 5E, the user clicks a bar in the result item 510 through the interface icon 515 to select a day, Sunday. The user's selection of Sunday is sent to the interactive element 490. Since the interactive element 490 is associated with the filter tool 440, which is included in the first branch sequence but not in the second branch sequences, a part of the first branch sequence is re-run to generate the result item 550 in FIG. 5F, which shows the curve corresponding to Sunday. The curves for the other days are not shown in the result item 550. None of the tools in the first branch sequence is re-run for generating the result item 550. Thus, by using multiple branch sequences in one workflow, the efficiency can be further improved for certain data analytics tasks by avoiding operation of tools not necessary for those data analytics tasks. The efficiency of the workflow can be optimized.

Figure 6:
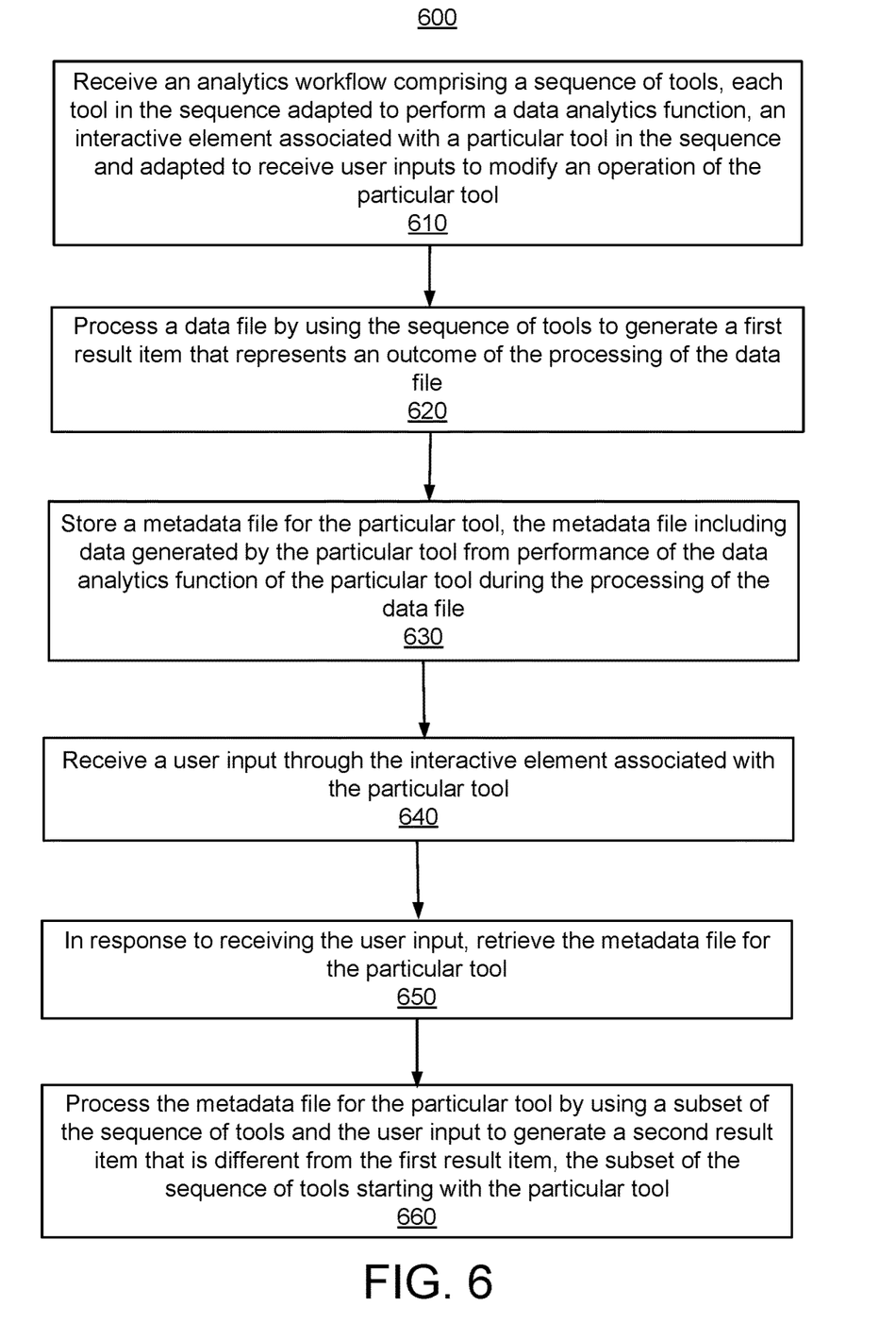
FIG. 6 is a flow chart illustrating a process of generating an interactive workflow according to one embodiment.

FIG. 6 is a flow chart illustrating a process of generating an interactive workflow 600 according to one embodiment. In some embodiments, the process 600 is performed by the data analytics application 150, although some or all of the operations in the process 600 may be performed by other entities in other embodiments. In some embodiments, the operations in the process 600 are performed in a different order and can include different and/or additional steps.

The data analytics application 150 receives 610 an analytics workflow. The analytics workflow comprises a sequence of tools. Each tool in the sequence is adapted to perform a data analytics function, such as input, output, preparation, join, predictive, spatial, investigation, parse, transform, and so on. An interactive element is associated with a particular tool in the sequence. The interactive element is adapted to receive user inputs to modify an operation of the particular tool.

The data analytics application 150 processes 620 a data file by using the sequence of tools to generate a first result item. The first result item represents an outcome of the processing of the data file. The data analytics application 150 stores 630 a metadata file for the particular tool. The metadata file includes data generated by the particular tool in the sequence from performance of the data analytics function of the particular tool during the processing of the data file. In some embodiments, each of one or more additional tools in the sequence is associated with an additional integrative element adapted to receive user inputs to modify an operation of the additional tool. For each additional tool, the data analytics application 150 stores a metadata file that includes data generated by the additional tool in the sequence from performance of the data analytics function of the additional tool during the processing of the data file. In some embodiments, the data analytics application 150 stores each respective metadata file in a separate cache. Each cache corresponds to a respective tool, i.e., the tool that generated the metadata file stored in the cache.

The data analytics application 150 receives 640 a user input through the interactive element associated with the particular tool. In some embodiments, the interactive element defines an interface icon, through which a user can provide an input to manipulate the analytics workflow. For instance, the interactive element receives the user interaction from the interface icon, transmits the user interaction to the particular tool, and triggers the particular tool to perform the data analytics function based on the user interaction.

In some embodiments, the data analytics application 150 generates the interactive element for the particular tool and applies the interactive element to the tool to update the analytics workflow. In one example, the data analytics application 150 selects the interactive element from a plurality of interactive elements based on the data analytics function of the tool in the analytics workflow. In another example, the data analytics application 150 selects a plurality of interactive elements based on the data analytics function of the tool in the analytics workflow and provides the plurality of interactive elements to the user for the user to select one or more interactive elements from the plurality of interactive elements. The data analytics application 150 receives the user's selection of the interactive element.

In response to receiving the user input, the data analytics application 150 retrieves 650 the metadata file for the particular tool. In embodiments where the data analytics application 150 stores the metadata data file and an additional metadata file for an additional tool in separate caches, the data analytics application 150 identifies the particular tool from the sequence of tools based on the interactive element. The data analytics application 150 identifies, based on the particular tool, the cache storing the metadata file for the particular tool and retrieves the metadata file for the particular tool from the identified cache.

Figure 7:
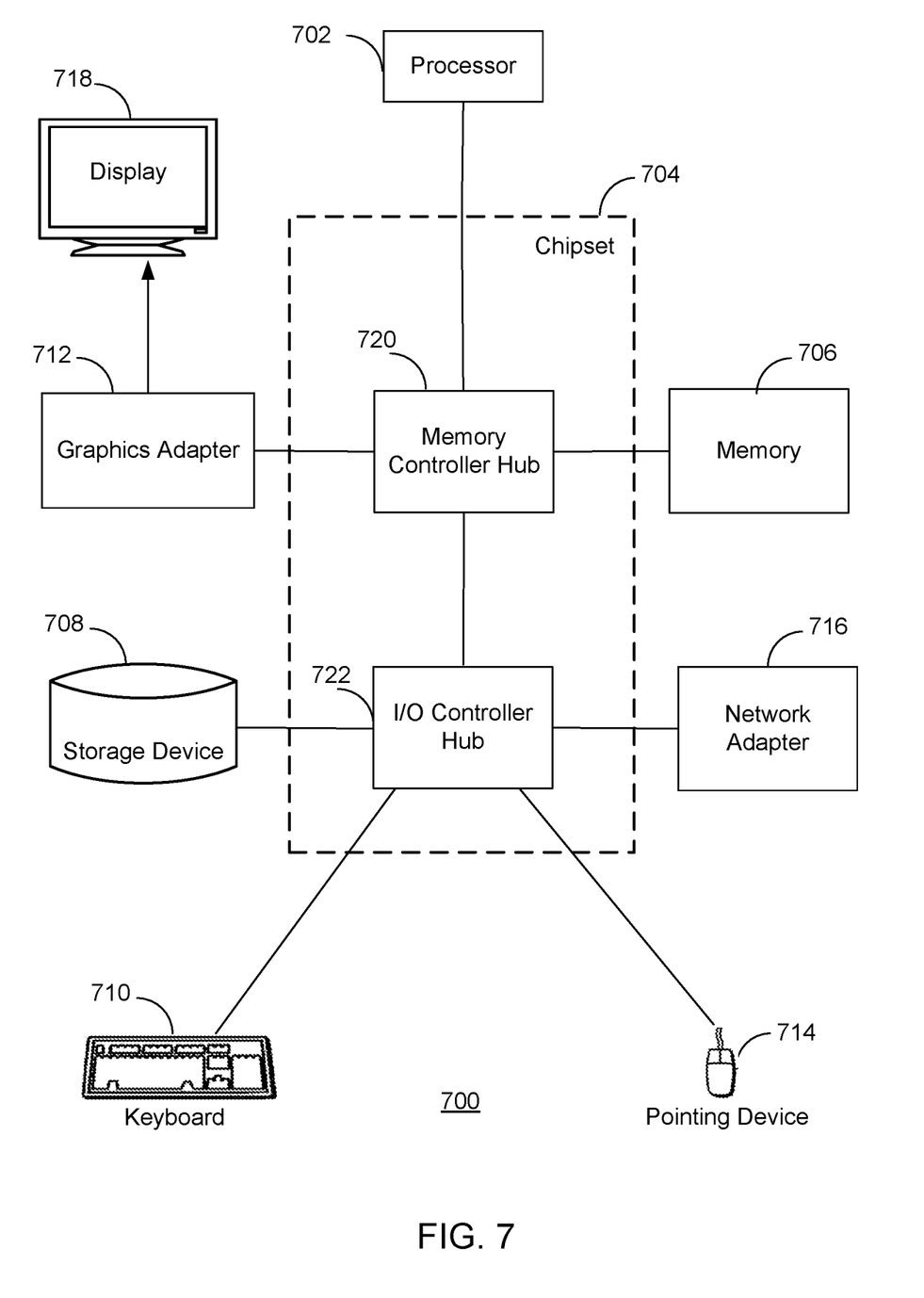
FIG. 7 is a high-level block diagram illustrating a functional view of a typical computer system for use as the data analytics system of FIG. 1 according to one embodiment.

The data analytics application 150 processes 660 the metadata file for the particular tool by using a subset of the sequence of tools and the user input to generate a second result item. The second result time is different from the first result item. The subset of the sequence of tools starts with the particular tool and may include one or more other tools subsequent to the particular tool in the sequence. In some embodiments, the sequence of tools comprises a first branch sequence of tools and a second branch sequence of tools. The particular tool is in the first branch sequence of tools but not in the second branch sequence of tools. The data analytics application 150 identifies the first branch sequence, i.e., the branch sequence that includes the particular tool, from all the branch sequences in the workflow based on the interactive element. The subset of the sequence of tools used to process the metadata file includes the particular tool and another tool that is subsequent to the particular tool in the first branch sequence of tools FIG. 7 is a high-level block diagram illustrating a functional view of a typical computer system 700 for use as the machine learning server 110 of FIG. 1 according to an embodiment.

The illustrated computer system includes at least one processor 702 coupled to a chipset 704. The processor 702 can include multiple processor cores on the same die. The chipset 704 includes a memory controller hub 720 and an input/output (I/O) controller hub 722. A memory 706 and a graphics adapter 712 are coupled to the memory controller hub 720 and a display 718 is coupled to the graphics adapter 712. A storage device 708, keyboard 710, pointing device 714, and network adapter 716 may be coupled to the I/O controller hub 722. In some other embodiments, the computer system 700 may have additional, fewer, or different components and the components may be coupled differently. For example, embodiments of the computer system 700 may lack displays and/or keyboards. In addition, the computer system 700 may be instantiated as a rack-mounted blade server or as a cloud server instance in some embodiments.

The memory 706 holds instructions and data used by the processor 702. In some embodiments, the memory 706 is a random-access memory. The storage device 708 is a non-transitory computer-readable storage medium. The storage device 708 can be a HDD, SSD, or other types of non-transitory computer-readable storage medium. Data processed and analyzed by the machine learning server 110 can be stored in the memory 706 and/or the storage device 708.

The pointing device 714 may be a mouse, track ball, or other type of pointing device, and is used in combination with the keyboard 710 to input data into the computer system 700. The graphics adapter 712 displays images and other information on the display 718. In some embodiments, the display 718 includes a touch screen capability for receiving user input and selections. The network adapter 716 couples the computer system 700 to the network 170.

The computer system 700 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 708, loaded into the memory 706, and executed by the processor 702.

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real time network operating systems.

Finally, it should be noted that the language used in the specification has been principally selected for readability and instructional purposes, and may not have been selected to delineate or circumscribe the inventive subject matter. Accordingly, the disclosure of the embodiments is intended to be illustrative, but not limiting.

I claim:

1. A computer-implemented method, comprising:
receiving an analytics workflow comprising a sequence of tools, each tool in the sequence adapted to perform a data analytics function, an interactive element associated with a particular tool in the sequence and adapted to receive user inputs to modify an operation of the particular tool, wherein at least one tool precedes the particular tool associated with the interactive element in the sequence of tools;
processing a data file by using the sequence of tools to generate a first result item that represents an outcome of the processing of the data file, wherein processing the data file includes at least performing an operation of the particular tool on the data file;
storing a metadata file for the particular tool, the metadata file including data generated by the particular tool from performance of the data analytics function of the particular tool during the processing of the data file;
receiving a user input through the interactive element associated with the particular tool to modify the operation of the particular tool on the data file;
in response to receiving the user input, retrieving the metadata file for the particular tool; and
processing the metadata file for the particular tool by using a subset of the sequence of tools and the user input to generate a second result item that is different from the first result item, the subset of the sequence of tools starting with the particular tool, wherein processing the metadata file for the particular tool comprises re-using at least a part of the data stored in the metadata file to perform the modified operation of the particular tool on the data file.

2. The computer-implemented method of claim 1, wherein an additional interactive element is associated with an addition tool in the sequence and is adapted to receive additional user inputs to modify an operation of the addition tool, further comprising:
storing an additional metadata file for the additional tool, the additional metadata file including data generated by the additional tool from performance of the data analytics function of the additional tool during the processing of the data file, the metadata file and additional metadata file stored in separate caches.

3. The computer-implemented method of claim 2, wherein in response to receiving the user input, retrieving the metadata file for the particular tool comprises:
identifying, based on the particular tool, the cache storing the metadata file for the particular tool; and
retrieving the metadata file of the particular tool from the identified cache.

4. The computer-implemented method of claim 3, wherein identifying, based on the particular tool, the cache storing the metadata file for the particular tool comprises:
identifying the particular tool from the sequence of tools based on the interactive element; and
identifying the cache based on the identification of the particular tool.

5. The computer-implemented method of claim 1, wherein the sequence of tools comprises a first branch sequence of tools and a second branch sequence of tools, the particular tool is in the first branch sequence of tools but not in the second branch sequence of tools, and the subset of the sequence of tools used to process the metadata file includes the particular tool and another tool that is subsequent to the particular tool in the first branch sequence of tools.

6. The method of claim 5, further comprising:
identifying, based on the interactive element, the first branch sequence of tools from the first branch sequence of tools and the second branch sequence of tools.

7. The method of claim 1, wherein receiving the user input through the interactive element comprises:
receiving the user input from an interface icon in the first result item, the interface icon allowing a user to interact with the first result item to provide the user input, the user input sent from the interface icon to the interactive element.

8. A non-transitory computer-readable memory storing executable computer program instructions, the instructions executable to perform operations comprising:
receiving an analytics workflow comprising a sequence of tools, each tool in the sequence adapted to perform a data analytics function, an interactive element associated with a particular tool in the sequence and adapted to receive user inputs to modify an operation of the particular tool, wherein at least one tool precedes the particular tool associated with the interactive element in the sequence of tools;
processing a data file by using the sequence of tools to generate a first result item that represents an outcome of the processing of the data file, wherein processing the data file includes at least performing an operation of the particular tool on the data file;
storing a metadata file for the particular tool, the metadata file including data generated by the particular tool from performance of the data analytics function of the particular tool during the processing of the data file;
receiving a user input through the interactive element associated with the particular tool to modify the operation of the particular tool on the data file;
in response to receiving the user input, retrieving the metadata file for the particular tool; and
processing the metadata file for the particular tool by using a subset of the sequence of tools and the user input to generate a second result item that is different from the first result item, the subset of the sequence of tools starting with the particular tool, wherein processing the metadata file for the particular tool comprises re-using at least a part of the data stored in the metadata file to perform the modified operation of the particular tool on the data file.

9. The non-transitory computer-readable memory of claim 8, wherein an additional interactive element is associated with an addition tool in the sequence and is adapted to receive additional user inputs to modify an operation of the addition tool, further comprising:
storing an additional metadata file for the additional tool, the additional metadata file including data generated by the additional tool from performance of the data analytics function of the additional tool during the processing of the data file, the metadata file and additional metadata file stored in separate caches.

10. The non-transitory computer-readable memory of claim 9, wherein in response to receiving the user input, retrieving the metadata file for the particular tool comprises:
identifying, based on the particular tool, the cache storing the metadata file for the particular tool; and
retrieving the metadata file of the particular tool from the identified cache.

11. The non-transitory computer-readable memory of claim 10, wherein identifying, based on the particular tool, the cache storing the metadata file for the particular tool comprises:
identifying the particular tool from the sequence of tools based on the interactive element; and
identifying the cache based on the identification of the particular tool.

12. The non-transitory computer-readable memory of claim 8, wherein the sequence of tools comprises a first branch sequence of tools and a second branch sequence of tools, the particular tool is in the first branch sequence of tools but not in the second branch sequence of tools, and the subset of the sequence of tools used to process the metadata file includes the particular tool and another tool that is subsequent to the particular tool in the first branch sequence of tools.

13. The non-transitory computer-readable memory of claim 12, wherein the operations further comprise:
identifying, based on the interactive element, the first branch sequence of tools from the first branch sequence of tools and the second branch sequence of tools.

14. The non-transitory computer-readable memory of claim 8, wherein receiving the user input through the interactive element comprises:
receiving the user input from an interface icon in the first result item, the interface icon allowing a user to interact with the first result item to provide the user input, the user input sent from the interface icon to the interactive element.

15. A computer system, comprising:
a computer processor for executing computer program instructions; and
a non-transitory computer-readable memory storing computer program instructions executable by the computer processor to perform operations comprising:
receiving an analytics workflow comprising a sequence of tools, each tool in the sequence adapted to perform a data analytics function, an interactive element associated with a particular tool in the sequence and adapted to receive user inputs to modify an operation of the particular tool, wherein at least one tool precedes the particular tool associated with the interactive element in the sequence of tools;
processing a data file by using the sequence of tools to generate a first result item that represents an outcome of the processing of the data file, wherein processing the data file includes at least performing an operation of the particular tool on the data file;
storing a metadata file for the particular tool, the metadata file including data generated by the particular tool from performance of the data analytics function of the particular tool during the processing of the data file;
receiving a user input through the interactive element associated with the particular tool to modify the operation of the particular tool on the data file;
in response to receiving the user input, retrieving the metadata file for the particular tool; and
processing the metadata file for the particular tool by using a subset of the sequence of tools and the user input to generate a second result item that is different from the first result item, the subset of the sequence of tools starting with the particular tool, wherein processing the metadata file for the particular tool comprises re-using at least a part of the data stored in the metadata file to perform the modified operation of the particular tool on the data file.

16. The computer system of claim 15, wherein an additional interactive element is associated with an addition tool in the sequence and is adapted to receive additional user inputs to modify an operation of the addition tool, further comprising:
storing an additional metadata file for the additional tool, the additional metadata file including data generated by the additional tool from performance of the data analytics function of the additional tool during the processing of the data file, the metadata file and additional metadata file stored in separate caches.

17. The computer system of claim 16, wherein in response to receiving the user input, retrieving the metadata file for the particular tool comprises:
identifying, based on the particular tool, the cache storing the metadata file for the particular tool; and
retrieving the metadata file of the particular tool from the identified cache.

18. The computer system of claim 15, wherein the sequence of tools comprises a first branch sequence of tools and a second branch sequence of tools, the particular tool is in the first branch sequence of tools but not in the second branch sequence of tools, and the subset of the sequence of tools used to process the metadata file includes the particular tool and another tool that is subsequent to the particular tool in the first branch sequence of tools.

19. The computer system of claim 18, wherein the operations further comprise:
identifying, based on the interactive element, the first branch sequence of tools from the first branch sequence of tools and the second branch sequence of tools.

20. The computer system of claim 15, wherein receiving the user input through the interactive element comprises:
receiving the user input from an interface icon in the first result item, the interface icon allowing a user to interact with the first result item to provide the user input, the user input sent from the interface icon to the interactive element.

* * * * *